(12) United States Patent
Humfeld et al.

(10) Patent No.: US 10,022,896 B2
(45) Date of Patent: Jul. 17, 2018

(54) CONTROLLING THE HEATING OF A COMPOSITE PART

(71) Applicant: The Boeing Company, Chicago, IL (US)

(72) Inventors: Keith Daniel Humfeld, Federal Way, WA (US); Steven Michael Shewchuk, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 240 days.

(21) Appl. No.: 14/949,332

(22) Filed: Nov. 23, 2015

(65) Prior Publication Data
US 2017/0144332 A1    May 25, 2017

(51) Int. Cl.
*B29C 35/02* (2006.01)
*F28F 13/00* (2006.01)

(52) U.S. Cl.
CPC ...... *B29C 35/0288* (2013.01); *B29C 35/0227* (2013.01); *F28F 13/00* (2013.01); *B29K 2995/0013* (2013.01); *F28F 2270/00* (2013.01); *F28F 2280/02* (2013.01)

(58) Field of Classification Search
None
See application file for complete search history.

(56) References Cited

U.S. PATENT DOCUMENTS

| 4,233,645 A | 11/1980 | Balderes et al. |
| 5,323,294 A | 6/1994 | Layton et al. |
| 6,084,775 A * | 7/2000 | Bartley ............... H01L 21/4882 165/80.3 |
| 6,665,186 B1 | 12/2003 | Calmidi et al. |

OTHER PUBLICATIONS

Humfeld et al., "System and Method for Forming a Composite Part," U.S. Appl. No. 14/794,238, filed Jul. 8, 2015, 28 pages.
Humfeld et al., "Hinged Baffle for Autoclave that Deploys at a Target Temperature during a Run Cycle," U.S. Appl. No. 14/869,892, filed Sep. 29, 2015, 28 pages.

* cited by examiner

*Primary Examiner* — Alison L Hindenlang
*Assistant Examiner* — Jamel M Nelson
(74) *Attorney, Agent, or Firm* — Yee & Associates, P.C.

(57) ABSTRACT

A method and apparatus for heating a part. The part is heated with the part at least partially surrounded by a surface of a tooling system, while a heatsink system is positioned relative to the part. A thermal conduction between the heatsink system and the part is changed during heating of the part.

35 Claims, 8 Drawing Sheets

CONTROLLING THE HEATING OF A COMPOSITE PART

BACKGROUND INFORMATION

1. Field

The present disclosure relates generally to heating parts and, in particular, to heating composite parts. Still more particularly, the present disclosure relates to a method and apparatus for dynamically controlling the heating of a composite part during heating of the part.

2. Background

Fabrication of a part may sometimes include curing the part. The curing of a part may be performed by applying heat, pressure, or both to the part. As one example, a part may be placed on or within a tool and then heated using an oven. In another example, the part may be placed on or within a tool and then heated and pressurized using an autoclave.

Variations in the geometry of a part may affect heat transfer rates during curing of the part. For example, curing parts that have non-uniform shapes may be more difficult than desired when using an autoclave, pressure chamber, oven, or other type of heating system. A part that does not have homogenous cross-sections may be considered as having a non-uniform shape. As one specific example, a non-uniform part may have a cross-sectional shape and configuration that varies along an axis that extends from one end of the part to the other end of the part. This type of cross-sectional shape and configuration of the part and tool may cause variations in the amount of heat energy required to change the temperature of the part and tool.

For example, when curing a part within an autoclave, airflow inside the autoclave may have different speeds relative to different locations on the part, depending on the shape and size of the part. These different airflow speeds may cause different rates of heat transfer from the air inside the autoclave to the part. The portions of the part that heat faster may reach a maximum cure temperature for the part faster than the portions of the part that heat slower.

As one specific example, when a horizontal stabilizer for an aircraft is cured in an autoclave, airflow may be faster over the outer surface of the horizontal stabilizer as compared to the airflow around the integral stiffeners that form channels within the horizontal stabilizer. Consequently, the stiffeners may cure at a rate that is slower than the outer surface of the part. Further, meeting cure requirements with respect to temperature and cure rate may be more difficult than desired. Therefore, it would be desirable to have a method and apparatus that take into account at least some of the issues discussed above, as well as other possible issues.

SUMMARY

In one illustrative embodiment, an apparatus comprises a surface of a tooling system, a heatsink, and a meltable layer. The surface of the tooling system is located around at least a portion of a part. The heatsink is positioned relative to the part to control a transfer of heat between air and the part relative to a set of locations on the part during heating of the part. The meltable layer attaches the heatsink to the surface in which the meltable layer is configured to melt at a selected melting temperature during heating of the part.

In another illustrative embodiment, an apparatus comprises a tooling system and a heatsink system. The tooling system has a surface that is located around at least a portion of a part. The heatsink system is positioned relative to the part to control a transfer of heat between air and the part during curing of the part. The heatsink system comprises a heatsink and a meltable layer. The heatsink is positioned relative to the part to control the transfer of heat between the air and the part relative to a set of locations on the part during heating of the part. The meltable layer attaches the heatsink to the surface in which the meltable layer is configured to melt at a selected melting temperature during heating of the part.

In yet another illustrative embodiment, a method is provided for heating a part. The part is heated with the part at least partially surrounded by a surface of a tooling system, while a heatsink system is positioned relative to the part. A thermal conduction between the heatsink system and the part is changed during heating of the part.

In still yet another illustrative embodiment, a method is provided for heating a part. A part is heated within a heating system at a plurality of heat transfer rates relative to a plurality of locations on the part based on a positioning of a heatsink system relative to the part. At least one of the plurality of heat transfer rates is changed during heating of the part when at least one meltable layer in the heatsink system reaches a selected melting temperature.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to have a method and apparatus for controlling the heating of a part. In particular, the illustrative embodiments recognize that it may be desirable to control the heating of a non-uniform part such that cure requirements with respect to temperature and cure rate may be met.

Thus, the illustrative embodiments provide a method for dynamically controlling the heating of a part. In one illustrative example, a part is heated with the part at least partially surrounded by a surface of a tooling system. A thermal conduction between the heatsink system and the part is changed during heating of the part.

In one illustrative example, a part is heated within a heating system at a plurality of heat transfer rates relative to a plurality of locations on the part based on a positioning of a heatsink system relative to the part. The heatsink is attached to the part through a meltable layer. At least one of the plurality of heat transfer rates is changed during heating of the part when at least one section of a meltable layer reaches a selected melting temperature.

In some illustrative examples, melting of a meltable layer that is used to attach a heatsink system to a part may enable the thermal conduction between the heatsink and the part to be increased during heating of the part. In this manner, melting of the meltable layer may increase a transfer of heat from the part to the air, which may slow an overall cure rate for the part. In other illustrative examples, melting of the meltable layer may reduce the thermal conduction between the heatsink system and a set of locations on the part to thereby reduce a transfer of heat from the air to the part at the set of locations.

Figure 1:
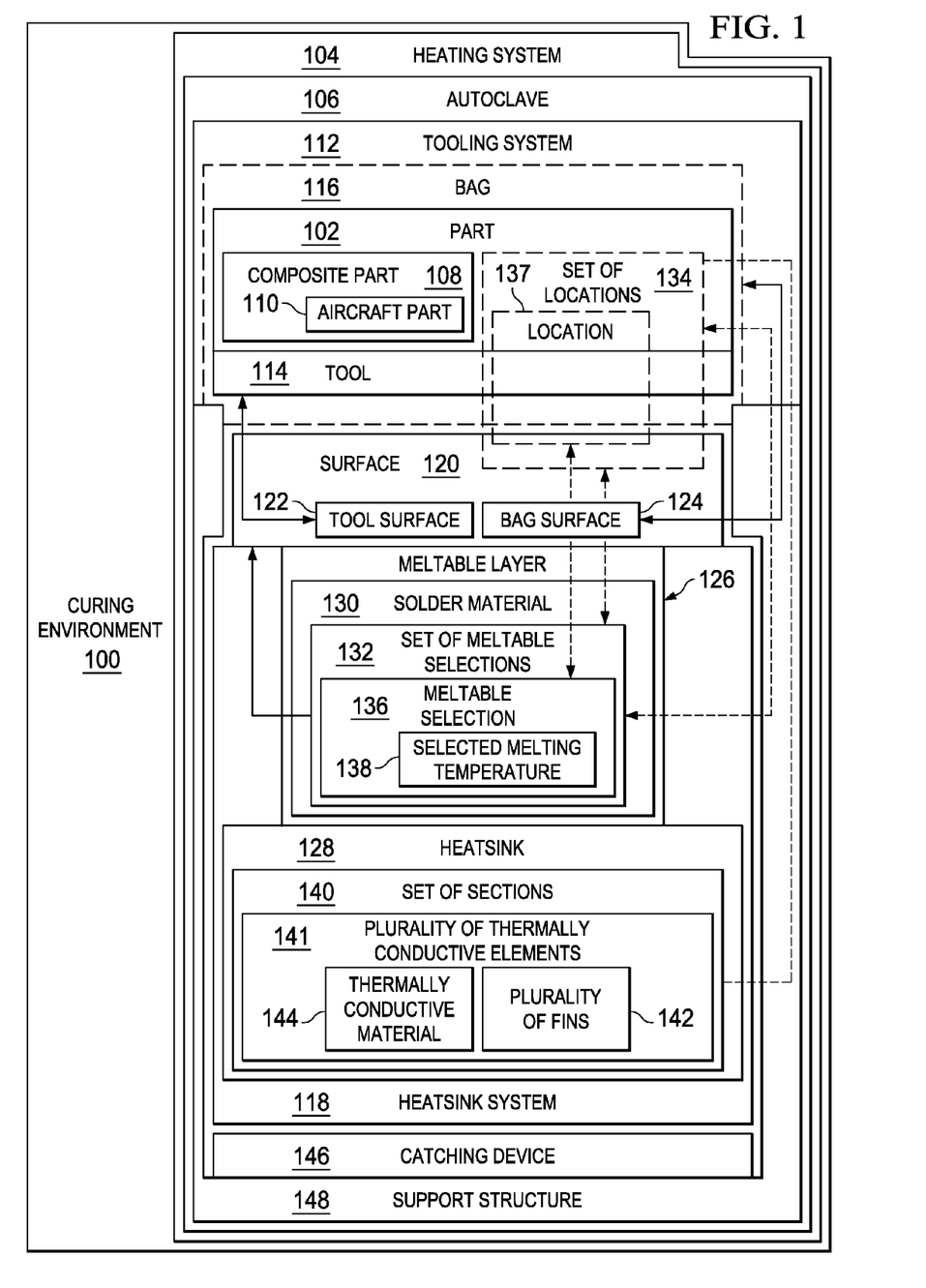
FIG. 1 is an illustration of a curing environment in the form of a block diagram in accordance with an illustrative embodiment.

Referring now to the figures and, in particular, with reference to FIG. 1, an illustration of a curing environment is depicted in the form of a block diagram in accordance with an illustrative embodiment. In this illustrative example, curing environment 100 may be an example of one environment in which part 102 may be cured using heating system 104.

In one illustrative example, heating system 104 takes the form of autoclave 106. In other illustrative examples, heating system 104 may take the form of a pressure chamber, an oven, or some other type of heating system. Depending on the implementation, heating system 104 may comprise at least one of an oven, an autoclave, a heater, an induction heater, a resistor, a susceptor, or some other type of device that may be used for heating.

Part 102 may take the form of composite part 108. In one illustrative example, composite part 108 may take the form of aircraft part 110. In other illustrative examples, composite part 108 may take the form of an automobile part, a spacecraft part, a watercraft part, a structural part, or some other type of part.

Part 102 may be cured using tooling system 112. Tooling system 112 may be used to support part 102 within heating system 104. In one illustrative example, tooling system 112 includes tool 114 and bag 116. Part 102 may be placed on or within tool 114 such that tool 114 supports part 102 during curing. In some cases, tool 114 may be referred to as a mold.

Bag 116 may be used to enclose part 102 and hermetically seal part 102. In other words, bag 116 may be used to create an air-tight environment around part 102. In some illustrative examples, bag 116 may enclose part 102 and may contact tool 114 without enclosing tool 114. For example, without limitation, bag 116 may be placed over part 102 while part 102 is positioned on top of tool 114. In other illustrative examples, bag 116 may enclose both part 102 and tool 114.

Tooling system 112 may have surface 120 that is formed by tool 114, bag 116, or both, depending on the implementation. Surface 120 may be located around at least a portion of part 102. Surface 120 may include tool surface 122 of tool 114, bag surface 124 of bag 116, or both. Depending on the implementation, surface 120 may be a continuous surface or a discontinuous surface.

Heatsink system 118 may be associated with surface 120 formed by tooling system 112. As used herein, when one component is "associated" with another component, the association is a physical association in the depicted examples.

For example, without limitation, a first component, such as heatsink system 118, may be considered to be associated with a second component, such as surface 120, by being at least one of attached to the second component, coupled to the second component, secured to the second component, bonded to the second component, mounted to the second component, welded to the second component, fastened to the second component, or connected to the second component in some other suitable manner. In some cases, the first component may be connected to the second component using a third component. Further, the first component may be considered to be associated with the second component by being formed as part of the second component, as an extension of the second component, or both.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required.

For example, without limitation, "at least one of item A, item B, or item C" or "at least one of item A, item B, and item C" may mean item A; item A and item B; item B; item A, item B, and item C; item B and item C; or item A and C. In some cases, "at least one of item A, item B, or item C" or "at least one of item A, item B, and item C" may mean, but is not limited to, two of item A, one of item B, and ten of item C; four of item B and seven of item C; or some other suitable combination.

In these illustrative examples, heatsink system 118 includes meltable layer 126 and heatsink 128. Heatsink 128 may be directly or indirectly associated with surface 120. For example, heatsink 128 may be indirectly associated with surface 120 through meltable layer 126. In one illustrative example, heatsink 128 may be associated with surface 120 through meltable layer 126 by being attached to meltable layer 126, which is attached to surface 120. In this manner, heatsink 128 may be indirectly attached to surface 120 through meltable layer 126.

Meltable layer 126 may be comprised of a material that can melt at a selected temperature. In one illustrative example, meltable layer 126 may be comprised of solder material 130. Depending on the implementation, solder material 130 may be comprised of at least one of aluminum, an aluminum alloy, copper, a copper alloy, a tin-lead alloy, a tin-silver-copper alloy, or some other type material that melts at a desired temperature.

Meltable layer 126 may form a continuous layer of meltable material or a discontinuous layer of meltable material, depending on the implementation. As one illustrative example, meltable layer 126 may comprise set of meltable sections 132. As used herein, a "set of" items may include one or more items. In this manner, set of meltable sections 132 may include one meltable section or a plurality of meltable sections.

In one illustrative example, set of meltable sections 132 may be attached to surface 120 relative to set of locations 134 on part 102. For example, without limitation, each meltable section in set of meltable sections 132 may be attached to surface 120 at a corresponding location of set of locations 134 on part 102. Meltable section 136 is an example of one meltable section in set of meltable sections 132. In this illustrative example, meltable section 136 is attached to surface 120 at location 137 on part 102.

Each location of set of locations 134 may correspond to a portion of part 102 at which thermal conduction is to be controlled. In particular, each location of set of locations 134 may correspond to a portion of part 102 at which thermal conduction between part 102 and heatsink 128 is to be controlled. For example, meltable section 136 may be attached to surface 120 relative to location 137 on part 102 to control the thermal conduction between part 102 and heatsink 128 at location 137.

Depending on the implementation, each meltable section 136 in set of meltable sections 132 may have a same or different selected melting temperature 138. In one illustrative example, each meltable section in set of meltable sections 132 in meltable layer 126 has selected melting temperature 138. When meltable layer 126 reaches selected melting temperature 138, meltable layer 126 may melt. The melting of meltable layer 126 may change the thermal conduction between heatsink 128 and part 102 during heating of part 102.

In one illustrative example, heatsink 128 includes set of sections 140. Each section in set of sections 140 may include plurality of thermally conductive elements 141. In one illustrative example, plurality of thermally conductive elements 141 take the form of plurality of fins 142.

Each thermally conductive element in plurality of thermally conductive elements 141 may be comprised of thermally conductive material 144. Thermally conductive material 144 may be comprised of at least one of aluminum, copper, silver, some other type of metal, a metal alloy, or some other type of thermally conductive material.

Depending on the implementation, set of sections 140 may include a single section and set of meltable sections 132 may be used to attach this single section to surface 120. In other illustrative examples, each meltable section in set of meltable sections 132 may be used to attach a corresponding section in set of sections 140 to surface 120.

In one illustrative example, part 102 may have a non-uniform shape. Set of locations 134 may be selected based on the portions of part 102 that would have slower cure rates compared to the other portions of part 102 during the heating of part 102 without the use of heatsink 128. Meltable layer 126 and heatsink 128 may be positioned below part 102 relative to set of locations 134 on part 102 to increase the transfer of heat from the air inside heating system 104 to part 102 at set of locations 134 during the heating of part 102 within heating system 104.

In this illustrative example, when meltable layer 126 melts at selected melting temperature 138, heatsink 128 may detach from surface 120, thereby reducing the thermal conduction between part 102 and heatsink 128. Selected melting temperature 138 may be selected as the minimum hold temperature needed for the curing of part 102 or a temperature within a selected range of this minimum hold temperature. In this manner, once meltable layer 126 reaches selected melting temperature 138, the rate at which part 102 is heated may be slowed down.

In some illustrative examples, catching device 146 may be used to catch and hold heatsink 128 and at least a portion of meltable layer 126 when meltable layer 126 melts away from surface 120. Catching device 146 may be supported by support structure 148 in some cases. Support structure 148 may be used to support tooling system 112. Support structure 148 may take the form of a table, a work table, a cart, or some other type of support structure. In some cases, catching device 146 may be a cable that is connected to some structure (not shown) and to heatsink 128.

In another illustrative example, set of locations 134 may be selected based on the portions of part 102 that would have faster cure rates compared to the other portions of part 102 during the heating of part 102 without the use of heatsink 128. Meltable layer 126 and heatsink 128 may be positioned relative to set of locations 134 on part 102 to control the transfer of heat from the air inside heating system 104 to part 102 at set of locations 134 during the heating of part 102 within heating system 104. Depending on the implementation, meltable layer 126 and heatsink 128 may be positioned above part 102, below part 102, at the side of part 102, or some combination thereof.

In one illustrative example, meltable layer 126 and heatsink 128 are positioned above part 102. In this example, when meltable layer 126 melts at selected melting temperature 138, the thickness of meltable layer 126 is reduced and gravity causes heatsink 128 to flatten out meltable layer 126 such that the surface area of contact between meltable layer 126 and surface 120 is increased. In this manner, the thermal conduction between part 102 and heatsink 128 may be increased. The transfer of heat from part 102 into the air is increased. Selected melting temperature 138 may be selected as a maximum hold temperature for the curing of part 102 or a temperature within a selected range of this maximum hold temperature.

In this manner, once meltable layer 126 reaches selected melting temperature 138, the rate at which part 102 is heated changes. When part 102 is of the type that has exothermic reactions that allow part 102 to be cured, the heating of part 102 due to these exothermic reactions may be slowed down when the part 102 reaches the maximum hold temperature for curing or the temperature within a selected range of this maximum hold temperature. However, when part 102 is of the type that has no exothermic reactions and thereby is not cured, the rate of heating of part 102 may be increased.

Figure 2:
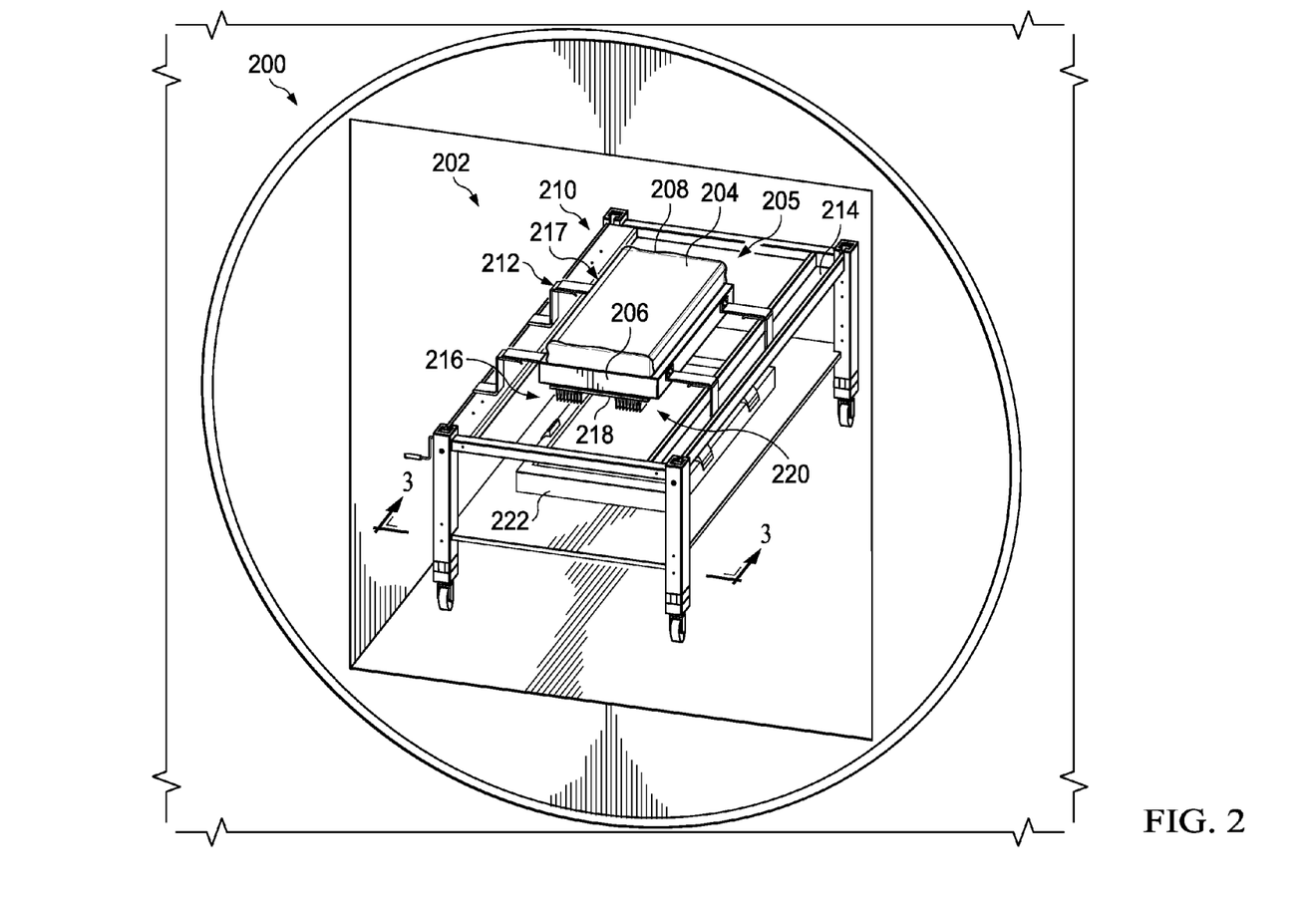
FIG. 2 is an illustration of an isometric view of an autoclave in accordance with an illustrative embodiment.

The illustrations of curing environment 100 in FIG. 1 and autoclave 200 in FIG. 2 are not meant to imply physical or architectural limitations to the manner in which an illustrative embodiment may be implemented. Other components in addition to or in place of the ones illustrated may be used.

Some components may be optional. Also, the blocks are presented to illustrate some functional components. One or more of these blocks may be combined, divided, or combined and divided into different blocks when implemented in an illustrative embodiment.

For example, without limitation, in some cases, heatsink system 118 may include multiple heatsinks. In some illustrative examples, heatsink system 118 may include multiple meltable layers, each having a different selected melting temperature.

In the illustrative examples described below, the same reference numeral may be used in more than one figure. This reuse of a reference numeral in different figures represents the same element in the different figures.

With reference now to FIG. 2, an illustration of an isometric view of an autoclave is depicted in accordance with an illustrative embodiment. In this illustrative example, autoclave 200 may be an example of one implementation for heating system 104 in FIG. 1 and, in particular, autoclave 106 in FIG. 1.

As depicted, interior 202 of autoclave 200 may be used for curing different types of parts. In this illustrative example, part 204 is cured within autoclave 200. The curing of part 204 is aided by tooling system 205. Tooling system 205 may be an example of one implementation for tooling system 112 in FIG. 1.

Tooling system 205 includes tool 206 and bag 208. Part 204 is positioned on and supported by tool 206. In this illustrative example, both part 204 and tool 206 are enclosed by bag 208. Part 204, tool 206, and bag 208 may be examples of implementations for part 102, tool 114, and bag 116, respectively, in FIG. 1.

Support structure 210 is used to support tooling system 205 and part 204. Support structure 210 may be an example of one implementation for support structure 148 in FIG. 1. As depicted, support structure 210 may be used to transport tooling system 205 and part 204 into and out of interior 202 of autoclave 200.

Support structure 210 includes retaining devices 212 and base structure 214. Retaining devices 212 are associated with base structure 214. In one illustrative example, retaining devices 212 are attached or physically secured to base structure 214. Retaining devices 212 may be used to hold tooling system 205 and part 204 in fixed positions relative to base structure 214.

In this illustrative example, heatsink system 216 is attached to surface 217. Surface 217 may be an example of one implementation for surface 120 in FIG. 1. Surface 217 may be formed by a portion of tool 206 and a portion of bag 208. As depicted, heatsink system 216 is attached directly to tool 206 in this example.

Heatsink system 216 may be an example of one implementation for heatsink system 118 in FIG. 1. As depicted, heatsink system 216 includes meltable layer 218 and heatsink 220. Meltable layer 218 and heatsink 220 may be examples of implementations for meltable layer 126 and heatsink 128, respectively, in FIG. 1. Meltable layer 218 is used to indirectly attach heatsink 220 to surface 217 formed by bag 208.

In this illustrative example, meltable layer 218 is comprised of a material that melts at a selected melting temperature. When meltable layer 218 reaches this selected melting temperature during the heating of part 204, meltable layer 218 melts away from tool 206. As meltable layer 218 melts, gravity may cause meltable layer 218 and, thereby, heatsink 220 to separate from bag 208.

Catching device 222 may be used to catch heatsink 220 and any portion of meltable layer 218 that melts away from bag 208. As depicted, catching device 222 may be supported by support structure 210. Catching device 222 may be an example of one implementation for catching device 146 in FIG. 1.

Figure 3:
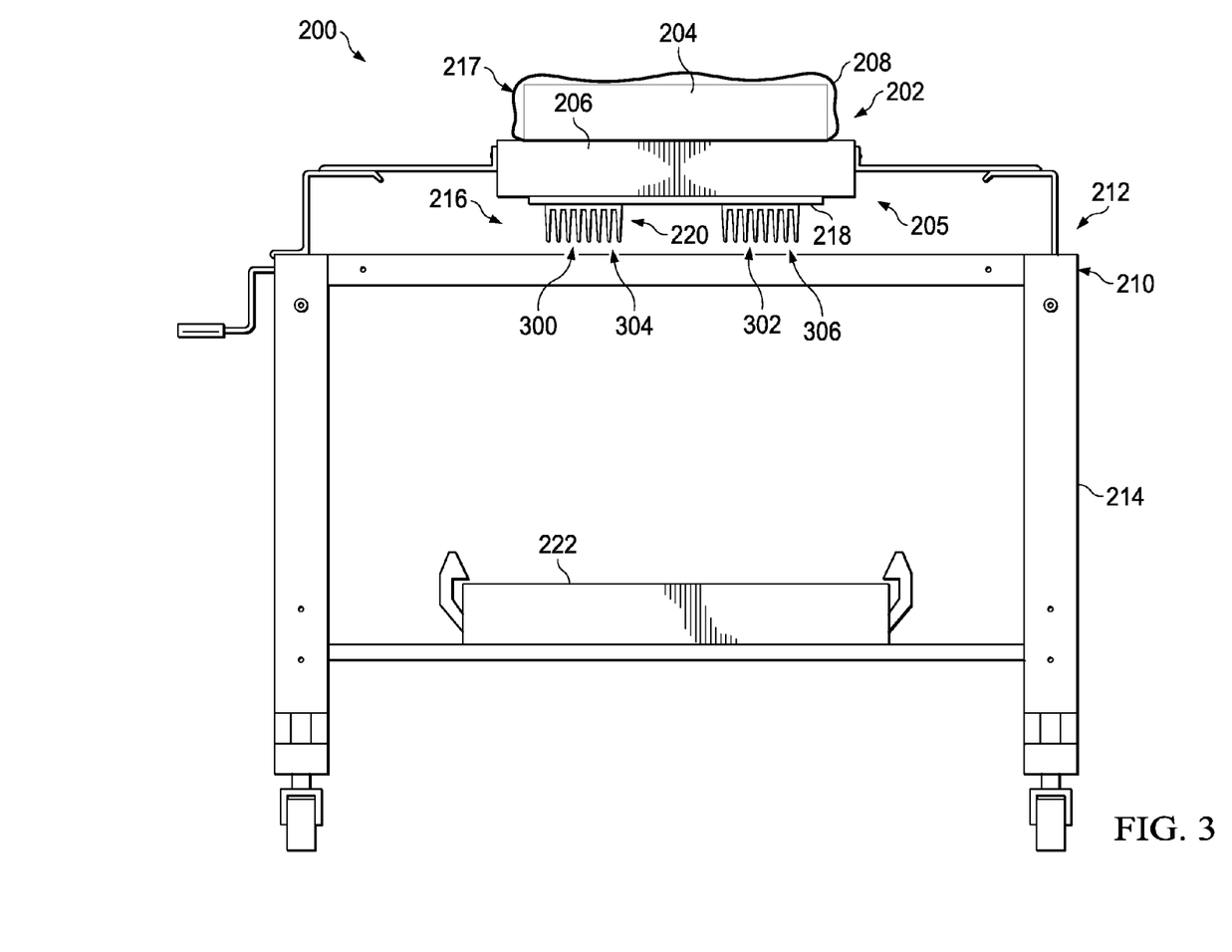
FIG. 3 is an illustration of an end view of a support structure, a tooling system, and a part in accordance with an illustrative embodiment.

With reference now to FIG. 3, an illustration of an end view of support structure 210, tooling system 205, and part 204 from FIG. 2 is depicted in accordance with an illustrative embodiment. In FIG. 3, an end view of support structure 210, tooling system 205, and part 204 from FIG. 2 is depicted taken from the view of lines 3-3 in FIG. 2. In this illustrative example, heatsink 220 may be more clearly seen.

As depicted, heatsink 220 includes section 300 and section 302, which may be an example of one implementation for set of sections 140 in FIG. 1. Section 300 comprises plurality of thermally conductive elements 304 and section 302 comprises plurality of thermally conductive elements 306. Plurality of thermally conductive elements 304 and plurality of thermally conductive elements 306 may be examples of implementations for plurality of thermally conductive elements 141 in FIG. 1.

As depicted, meltable layer 218 takes the form of a continuous layer that is attached to surface 217. Section 300 and section 302 increase a transfer of heat from the air inside autoclave 200 to part 204 at the locations where section 300 and section 302 are associated with surface 217 through meltable layer 218. In this example, section 300 and section 302 are associated with surface 217 by being attached to meltable layer 218, which is attached to surface 217.

When meltable layer 218 reaches a selected melting temperature inside autoclave 200, meltable layer 218 melts away from surface 217. Gravity may then cause meltable layer 218 and, thereby, heatsink 220 to detach from surface 217, which causes the thermal conduction between part 204 and heatsink 220 to be reduced to substantially zero. Catching device 222 catches heatsink 220.

The selected melting temperature is selected at or within a selected range of a minimum hold temperature for the curing of part 204. As one illustrative example, the selected melting temperature may be between about 225 degrees Fahrenheit and about 285 degrees Fahrenheit. The association of heatsink 220 with surface 217, causes increased heating of part 204 at the locations on part 204 where heatsink 220 is attached relative to part 204. When heatsink 220 detaches from surface 217, the heating of part 204 at these locations is reduced.

In other illustrative examples, heatsink 220 may be attached to a biasing system (not shown) that is attached to support structure 210, catching device 222, or some other type of structure (not shown). The biasing system (not shown) may include, for example, without limitation, one or more springs that are under tension. When meltable layer 402 melts, the biasing system may cause heatsink 404 to pull away from surface 217.

Figure 4:
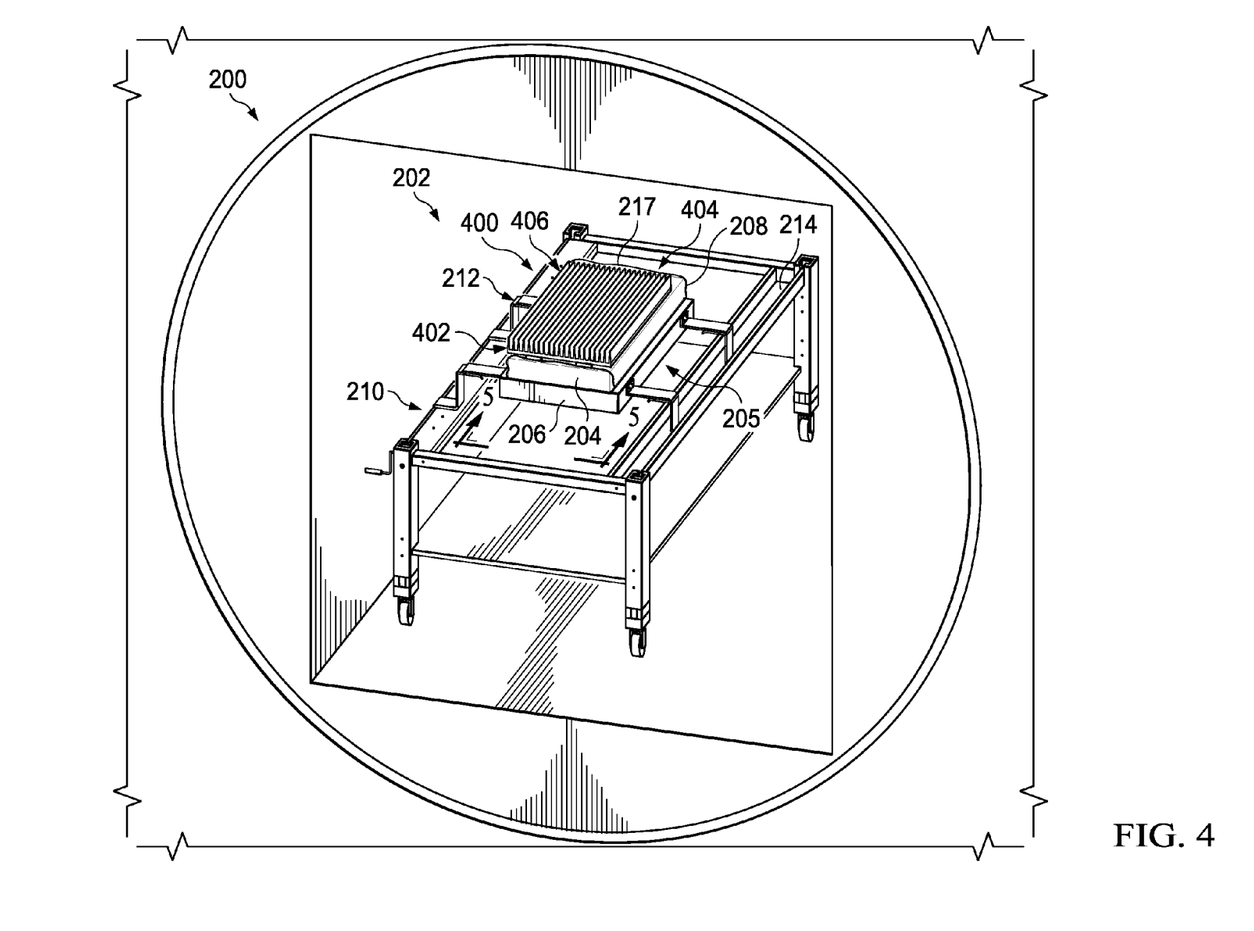
FIG. 4 is an illustration of another isometric view of an interior of an autoclave in accordance with an illustrative embodiment.

With reference now to FIG. 4, an illustration another isometric view of interior 202 of autoclave 200 is depicted in accordance with an illustrative embodiment. In this illustrative example, a different type of heatsink system is used to control the heating of part 204 within autoclave 200.

Heatsink system 400 may be another example of one implementation for heatsink system 118 in FIG. 1. Heatsink system 400 includes meltable layer 402 and heatsink 404. Meltable layer 402 and heatsink 404 are examples of implementations for meltable layer 126 and heatsink 128, respectively, in FIG. 1. As depicted, heatsink 404 takes the form of a single section that is comprised of plurality of thermally conductive elements 406. Plurality of thermally conductive elements 406 may be an example of one implementation for plurality of thermally conductive elements 141 in FIG. 1.

Figure 5:
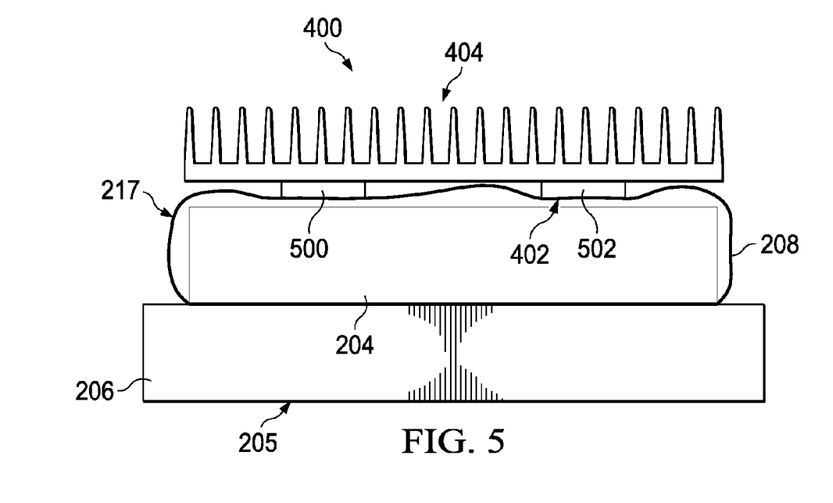
FIG. 5 is an illustration of an end view of a heatsink system, a tooling system, and a part in accordance with an illustrative embodiment.

With reference now to FIG. 5, an illustration of an end view of heatsink system 400, tooling system 205, and part 204 from FIG. 4 is depicted in accordance with an illustrative embodiment. In FIG. 5, an end view of heatsink system 400, tooling system 205, and part 204 from FIG. 4 is depicted taken from the view of lines 5-5 in FIG. 4. Support structure 210 from FIG. 4 is not shown in this end view. In this illustrative example, heatsink 404 and meltable layer 402 may be more clearly seen.

As depicted in this example, meltable layer 402 is a discontinuous layer that includes meltable section 500 and meltable section 502. Meltable section 500 and meltable section 502 may be an example of one implementation for set of meltable sections 132 in FIG. 1.

In this illustrative example, meltable section 500 and meltable section 502 have the same selected melting temperature. When meltable section 500 and meltable section 502 reach the selected melting temperature, both meltable section 500 and meltable section 502 may melt. Gravity and the weight of heatsink 404 cause the thickness of meltable section 500 and meltable section 502 to be reduced. In other words, meltable layer 402 becomes flattened, thereby increasing the surface area of contact between meltable layer 402 and surface 217.

The selected melting temperature for meltable layer 402 may be selected at or close to a maximum hold temperature for the curing of part 204. As one illustrative example, the selected melting temperature may be between about 315 degrees Fahrenheit and about 350 degrees Fahrenheit. In another illustrative example, the selected melting temperature may be above 350 degrees Fahrenheit.

During heating of part 204, the association of heatsink 404 with surface 217 causes increased heating of part 204 at the locations on part 204 where heatsink 404 is attached relative to part 204. When meltable layer 402 melts, the transfer of heat from part 204 to the air may be increased to ensure that part 204 does not exceed the maximum hold temperature for curing of part 204.

In other illustrative examples, heatsink 404 may be attached to a biasing system (not shown) that is attached to some structure (not shown), one or more sides of autoclave 200, a ceiling of autoclave 200, or a combination thereof. The biasing system (not shown) may include, for example, without limitation, one or more springs that are under compression. When meltable layer 402 melts, the biasing system may cause heatsink 404 to push against meltable layer 402, thereby reducing the thickness of meltable layer 402 and increasing the surface area of contact between meltable layer 402 and part 204.

Figure 6:
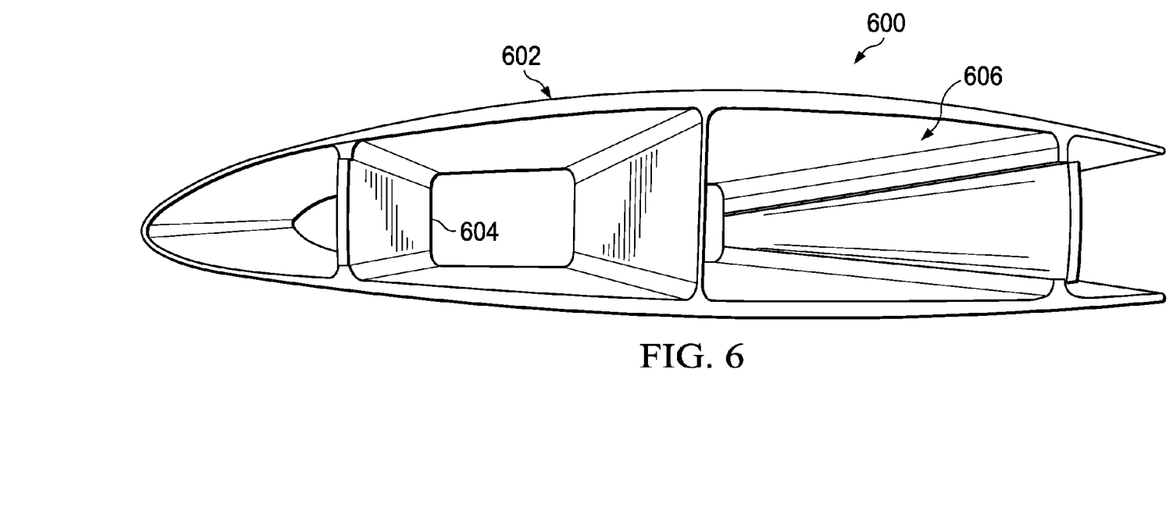
FIG. 6 is an illustration of a side view of a non-uniform part in accordance with an illustrative embodiment.

With reference now to FIG. 6, an illustration of a side view of a non-uniform part is depicted in accordance with an illustrative embodiment. In this illustrative example, aircraft part 600 may be an example of one implementation for part 102 in FIG. 1. Aircraft part 600 is a non-uniform part in this illustrative example.

Aircraft part 600 has outer surface 602 and plurality of septa 604. Plurality of septa 604 form plurality of channels 606. A heatsink system, such as heatsink system 118 in FIG. 1, may be used to control the heating of aircraft part 600 to cure aircraft part 600 to ensure that plurality of septa 604 are heated at a rate similar to the rate at which outer surface 602 is heated.

The illustrations of autoclave 200 in FIGS. 2-5, heatsink system 216 in FIGS. 2-3, heatsink system 400 in FIGS. 4-5, and aircraft part 600 in FIG. 6 are not meant to imply physical or architectural limitations to the manner in which an illustrative embodiment may be implemented. Other components in addition to or in place of the ones illustrated may be used. Some components may be optional.

The different components shown in FIGS. 2-6 may be illustrative examples of how components shown in block form in FIG. 1 can be implemented as physical structures. Additionally, some of the components in FIGS. 2-6 may be combined with components in FIG. 1, used with components in FIG. 1, or a combination of the two.

Figure 7:
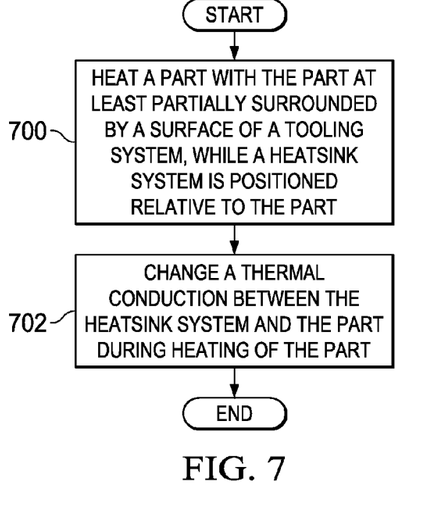
FIG. 7 is an illustration of a process for heating a part in the form of a flowchart in accordance with an illustrative embodiment.

With reference now to FIG. 7, an illustration of a process for heating a part is depicted in the form of a flowchart in accordance with an illustrative embodiment. The process illustrated in FIG. 7 may be used to heat a part such as, for example, without limitation, part 102 in FIG. 1.

The process may begin by heating a part with the part at least partially surrounded by a surface of a tooling system, while a heatsink system is positioned relative to the part (operation 700). A thermal conduction between the heatsink system and the part is changed during heating of the part (operation 702), with the process terminating thereafter.

Figure 8:
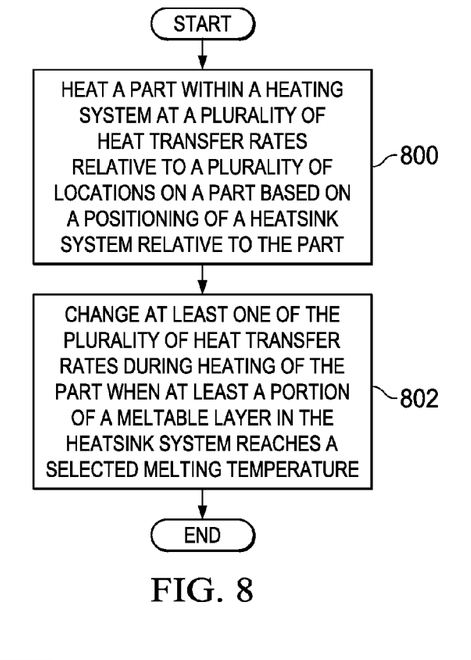
FIG. 8 is an illustration of a process for heating a part in the form of a flowchart in accordance with an illustrative embodiment.

With reference now to FIG. 8, an illustration of a process for heating a part is depicted in the form of a flowchart in accordance with an illustrative embodiment. The process illustrated in FIG. 8 may be used to heat a part such as, for example, without limitation, part 102 in FIG. 1.

The process may begin by heating a part within a heating system at a plurality of heat transfer rates relative to a plurality of locations on a part based on a positioning of a heatsink system relative to the part (operation 800). At least one of the plurality of heat transfer rates is changed during heating of the part when at least a portion of a meltable layer in the heatsink system reaches a selected melting temperature (operation 802), with the process terminating thereafter.

Figure 9:
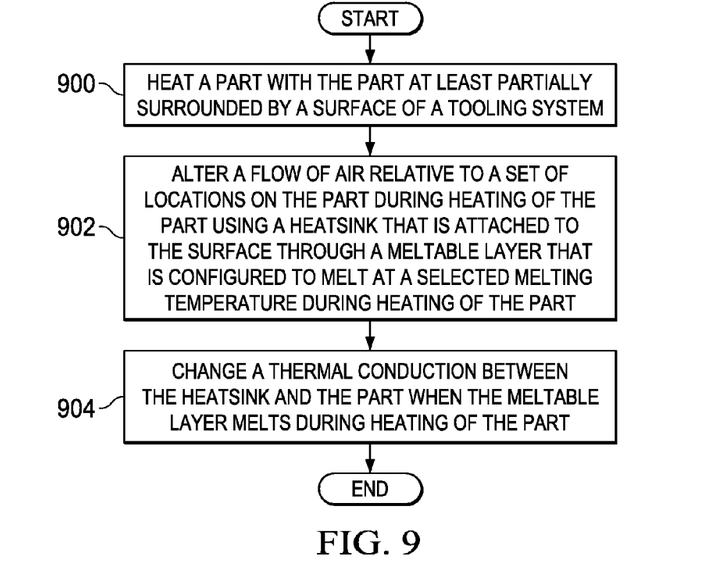
FIG. 9 is an illustration of a process for heating a part in the form of a flowchart in accordance with an illustrative embodiment.

With reference now to FIG. 9, an illustration of a process for heating a part is depicted in the form of a flowchart in accordance with an illustrative embodiment. The process illustrated in FIG. 9 may be used to heat a part such as, for example, without limitation, part 102 in FIG. 1.

The process begins by heating a part with the part at least partially surrounded by a surface of a tooling system (operation 900). Next, a flow of air relative to a set of locations on the part is altered during heating of the part using a heatsink that is attached to the surface through a meltable layer that is configured to melt at a selected melting temperature during heating of the part (operation 902). Further, in operation 902, the heatsink increases the conductive surface area with which the air comes into contact. Thereafter, a thermal conduction between the heatsink and the part is changed when the meltable layer melts during heating of the part (operation 904), with the process terminating thereafter.

Figure 10:
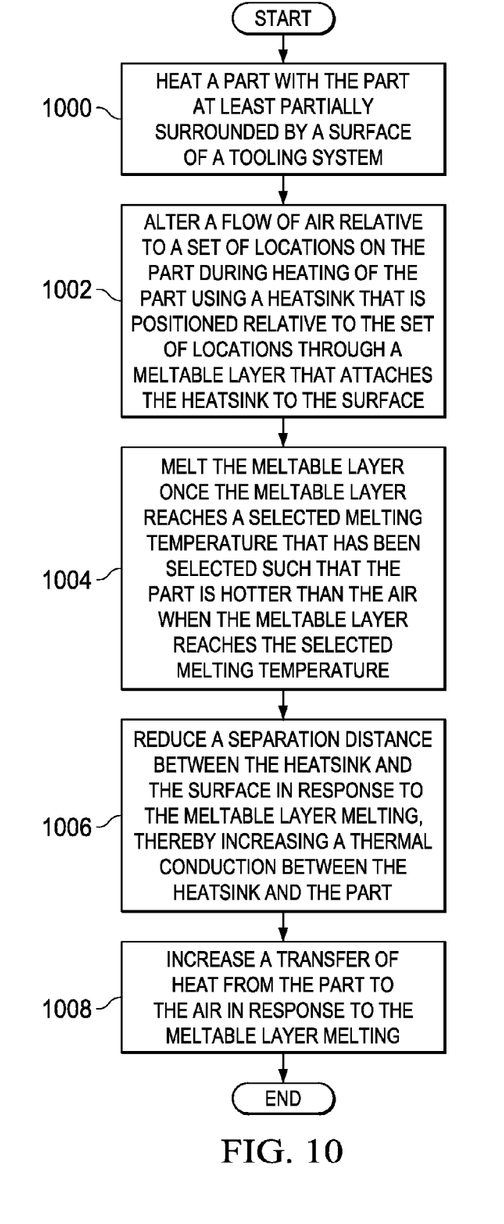
FIG. 10 is an illustration of a process for controlling a heating of a part in the form of a flowchart in accordance with an illustrative embodiment.

With reference now to FIG. 10, an illustration of a process for controlling heating of a part is depicted in the form of a flowchart in accordance with an illustrative embodiment. The process illustrated in FIG. 10 may be used to control the heating of a part such as, for example, without limitation, part 102 in FIG. 1.

The process begins by heating a part with the part at least partially surrounded by a surface of a tooling system (operation 1000). Next, a flow of air is altered relative to a set of locations on the part during curing of the part using a heatsink that is positioned relative to the set of locations on the part through a meltable layer that attaches the heatsink to the surface (operation 1002).

Thereafter, the meltable layer melts once the meltable layer reaches a selected melting temperature that has been selected such that the part is hotter than the air when the meltable layer reaches the selected melting temperature (operation 1004). In operation 1004, the part may be hotter than the air because the curing of the part is a chemical reaction that is exothermic. The part has exothermic reactions that cause the part to be hotter than the air.

A separation distance between the heatsink and the surface is reduced in response to the meltable layer melting, thereby increasing a thermal conduction between the heatsink and the part (operation 1006). A transfer of heat from the part to the air is increased in response to the meltable layer melting (operation 1008), with the process terminating thereafter.

Figure 11:
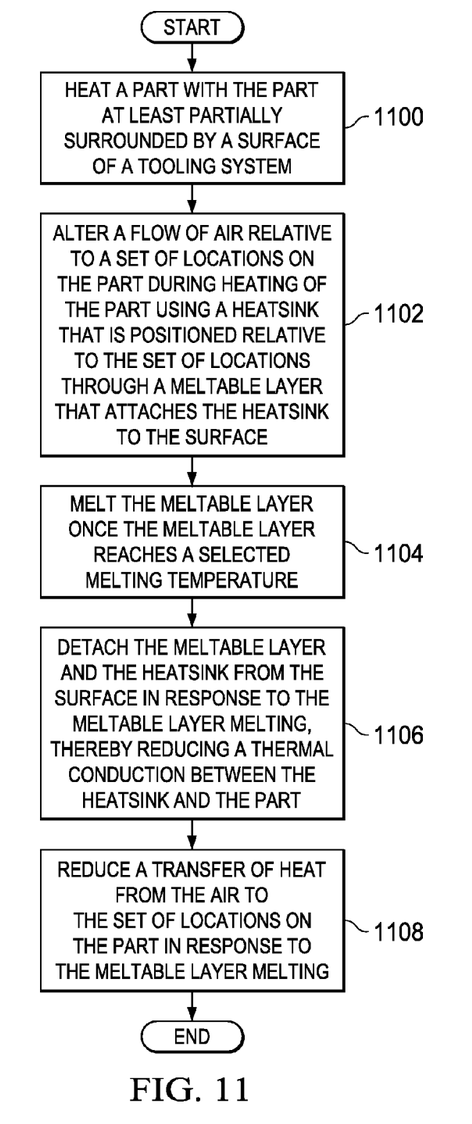
FIG. 11 is an illustration of a process for controlling a heating of a part in the form of a flowchart in accordance with an illustrative embodiment.

With reference now to FIG. 11, an illustration of a process for controlling heating of a part is depicted in the form of a flowchart in accordance with an illustrative embodiment. The process illustrated in FIG. 11 may be used to control the heating of a part such as, for example, without limitation, part 102 in FIG. 1.

The process begins by heating a part with the part at least partially surrounded by a surface of a tooling system (operation 1100). Next, a flow of air is altered relative to a set of locations on the part during heating of the part using a heatsink that is positioned relative to the set of locations through a meltable layer that attaches the heatsink to the surface (operation 1102).

Thereafter, the meltable layer melts once the meltable layer reaches a selected melting temperature (operation 1104). The meltable layer and the heatsink are detached from the surface in response to the meltable layer melting, thereby reducing a thermal conduction between the heatsink and the part (operation 1106). A transfer of heat from the air to the set of locations on the part is reduced in response to the meltable layer melting (operation 1108), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 12:
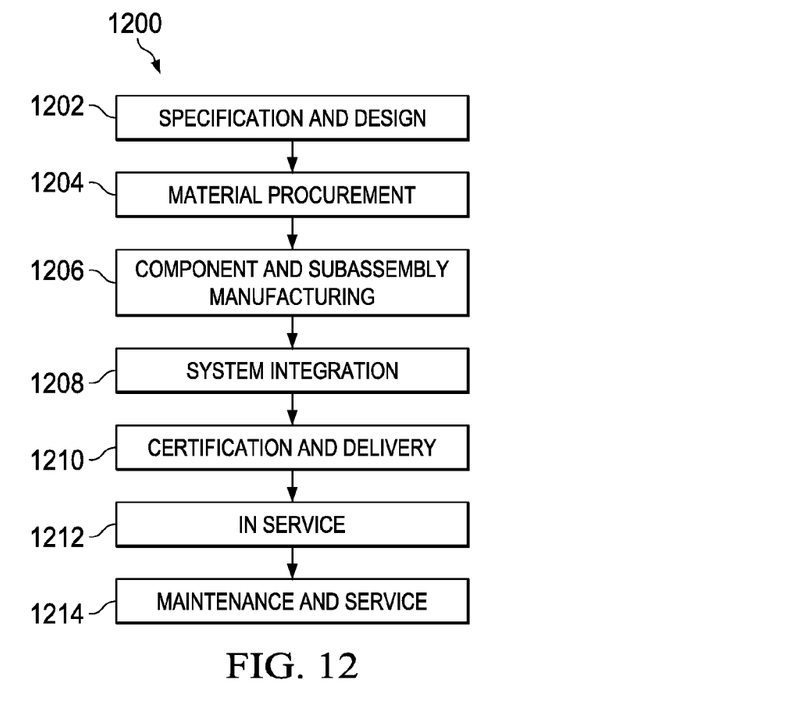
FIG. 12 is an illustration of an aircraft manufacturing and service method in the form of a block diagram in accordance with an illustrative embodiment.
Figure 13:
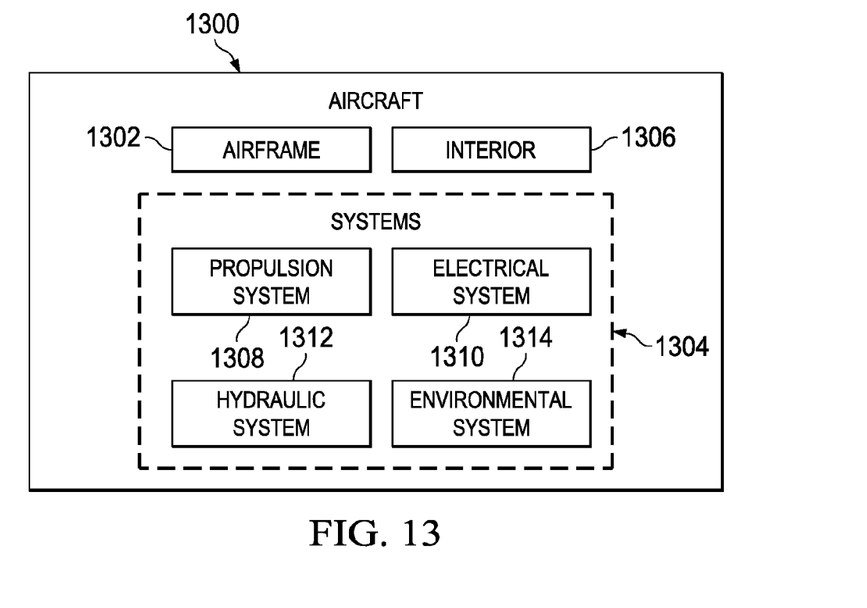
FIG. 13 is an illustration of an aircraft in the form of a block diagram in accordance with an illustrative embodiment.

Illustrative embodiments of the disclosure may be described in the context of aircraft manufacturing and service method 1200 as shown in FIG. 12 and aircraft 1300 as shown in FIG. 13. Turning first to FIG. 12, an illustration of an aircraft manufacturing and service method is depicted in accordance with an illustrative embodiment. During preproduction, aircraft manufacturing and service method 1200 may include specification and design 1202 of aircraft 1300 in FIG. 13 and material procurement 1204.

During production, component and subassembly manufacturing 1206 and system integration 1208 of aircraft 1300 in FIG. 13 takes place. Thereafter, aircraft 1300 in FIG. 13 may go through certification and delivery 1210 in order to be placed in service 1212. While in service 1212 by a customer, aircraft 1300 in FIG. 13 is scheduled for maintenance and service 1214, which may include modification, reconfiguration, refurbishment, and other maintenance or service.

Each of the processes of aircraft manufacturing and service method 1200 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 13, an illustration of an aircraft is depicted in which an illustrative embodiment may be implemented. In this example, aircraft 1300 is produced by aircraft manufacturing and service method 1200 in FIG. 12 and may include airframe 1302 with a plurality of systems 1304 and interior 1306. Examples of systems 1304 include one or more of propulsion system 1308, electrical system 1310, hydraulic system 1312, and environmental system 1314. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1200 in FIG. 12. In particular, heatsink system 118 from FIG. 1 may be used to control the heating of any number of parts for aircraft 1300 during any one of the stages of aircraft manufacturing and service method 1200. For example, without limitation, heatsink system 118 from FIG. 1 may be used to control the heating, and in most cases, curing, of one or more aircraft parts during at least one of material procurement 1204, component and subassembly manufacturing 1206, system integration 1208, maintenance and service 1214, or some other stage of aircraft manufacturing and service method 1200. Further, the aircraft parts that are heated using heatsink system 118 may be used to form at least one of airframe 1302 of aircraft 1300, interior 1306 of aircraft 1300, or some other portion of aircraft 1300.

In one illustrative example, components or subassemblies produced in component and subassembly manufacturing 1206 in FIG. 12 may be fabricated or manufactured in a manner similar to components or subassemblies produced while aircraft 1300 is in service 1212 in FIG. 12. As yet another example, one or more apparatus embodiments, method embodiments, or a combination thereof may be utilized during production stages, such as component and subassembly manufacturing 1206 and system integration 1208 in FIG. 12. One or more apparatus embodiments, method embodiments, or a combination thereof may be utilized while aircraft 1300 is in service 1212 and/or during maintenance and service 1214 in FIG. 12. The use of a number of the different illustrative embodiments may substantially expedite the assembly of and/or reduce the cost of aircraft 1300.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
 a surface of a tooling system that is located around at least a portion of a part;
 a heatsink that is positioned relative to the part to control a transfer of heat between air and the part relative to a set of locations on the part during heating of the part; and
 a meltable layer that attaches the heatsink to the surface in which the meltable layer is configured to melt at a selected melting temperature during heating of the part.

2. The apparatus of claim 1, wherein the selected melting temperature is selected such that the part is hotter than the air when the meltable layer reaches the selected melting temperature.

3. The apparatus of claim 1, wherein melting of the meltable layer reduces a separation distance between the heatsink and the surface of the tooling system, thereby increasing a thermal conduction between the heatsink and the part to allow the heat to be transferred from the part to the air.

4. The apparatus of claim 1, wherein melting of the meltable layer increases a surface area of contact between the meltable layer and the surface and between the meltable layer and the heatsink, thereby increasing a thermal conduction between the heatsink and the part to allow the heat to be transferred from the part to the air.

5. The apparatus of claim 1, wherein melting of the meltable layer causes the meltable layer, and thereby, the heatsink, to detach from the surface of the tooling system during heating of the part.

6. The apparatus of claim 5, wherein a thermal conduction between the heatsink and the part is reduced when the meltable layer and the heatsink separate from the surface of the tooling system.

7. The apparatus of claim 6 further comprising:
 a catching device that catches the heatsink when the heatsink separates from the surface during curing of the part.

8. The apparatus of claim 1, wherein the meltable layer comprises:
 a set of meltable sections, wherein each meltable section in the set of meltable sections is attached to the surface relative to a corresponding location in the set of locations on the part.

9. The apparatus of claim 1, wherein the heatsink comprises:
 a set of sections, wherein each section in the set of sections comprises a plurality of thermally conductive elements and is positioned relative to a corresponding location in the set of locations on the part.

10. The apparatus of claim 1 further comprising:
 the tooling system.

11. The apparatus of claim 10, wherein the tooling system comprises:
 a tool that supports the part during curing of the part, wherein the surface is formed by at least a portion of the tool.

12. The apparatus of claim 10, wherein the tooling system comprises:
 a bag that creates an air-tight environment around the part, wherein the surface is formed by at least a portion of the bag.

13. The apparatus of claim 1, wherein the part is a composite part.

14. The apparatus of claim 1 further comprising:
 a heating system for heating the part.

15. The apparatus of claim 14, wherein the heating system comprises at least one of an oven, an autoclave, a heater, an induction heater, a resistor, or a susceptor.

16. The apparatus of claim 1, wherein the meltable layer comprises:
 a set of meltable sections, wherein the selected melting temperature of at least one meltable section in the set of meltable sections is between about 225 degrees Fahrenheit and about 285 degrees Fahrenheit.

17. The apparatus of claim 1, wherein the meltable layer comprises:
 a set of meltable sections, wherein the selected melting temperature of at least one meltable section in the set of meltable sections is between about 315 degrees Fahrenheit and about 350 degrees Fahrenheit.

18. The apparatus of claim 1, wherein the meltable layer comprises:
 a set of meltable sections, wherein the selected melting temperature of at least one meltable section in the set of meltable sections is above 350 degrees Fahrenheit.

19. The apparatus of claim 1, wherein the heatsink comprises:
 a plurality of thermally conductive elements.

20. The apparatus of claim 19, wherein a thermally conductive element in the plurality of thermally conductive elements comprises at least one of aluminum, copper, silver, a metal, or a metal alloy.

21. The apparatus of claim 1, wherein the meltable layer comprises a solder material.

22. The apparatus of claim 1, wherein the selected melting temperature is selected such that the part is hotter than the air when the meltable layer reaches the selected melting temperature; wherein melting of the meltable layer reduces a separation distance between the heatsink and the surface of the tooling system, thereby increasing a thermal conduction between the heatsink and the part to allow the heat to be transferred from the part to the air; and
 wherein the meltable layer comprises:
 a set of meltable sections, wherein each meltable section in the set of meltable sections is attached to the surface relative to a corresponding location in the set of locations on the part and wherein the selected melting temperature of at least one meltable section in the set of meltable sections is between about 315 degrees Fahrenheit and about 350 degrees Fahrenheit.

23. The apparatus of claim 1, wherein melting of the meltable layer causes the meltable layer, and thereby, the heatsink, to separate from the surface of the tooling system during heating of the part; wherein a thermal conduction between the heatsink and the part is reduced when the meltable layer and the heatsink separate from the surface of the tooling system;
 wherein the heatsink comprises:
 a set of sections, wherein each section in the set of sections comprises a plurality of thermally conductive elements and is positioned relative to a corresponding location in the set of locations; and
 wherein the meltable layer comprises:
 a set of meltable sections, wherein each meltable section in the set of meltable sections is attached to the surface relative to a corresponding location in the set of locations on the part and wherein the selected melting temperature of at least one meltable section in the set of meltable sections is between about 225 degrees Fahrenheit and about 285 degrees Fahrenheit.

24. An apparatus comprising:
a tooling system having a surface that is located around at least a portion of a part;
a heatsink system that is positioned relative to the part to control a transfer of heat between air and the part during curing of the part, wherein the heatsink system comprises:
   a heatsink that is positioned relative to the part to control the transfer of heat between the air and the part relative to a set of locations on the part during heating of the part; and
   a meltable layer that attaches the heatsink to the surface in which the meltable layer is configured to melt at a selected melting temperature during heating of the part.

25. A method for heating a part, the method comprising:
heating the part with the part at least partially surrounded by a surface of a tooling system that is located around at least a portion of the part, while a heatsink is positioned relative to the part to control a transfer of heat between air and the part relative to a set of locations on the part during heating of the part, wherein a meltable layer attaches the heatsink to the surface in which the meltable layer is configured to melt at a selected melting temperature during heating of the part; and
changing a thermal conduction between the heatsink system and the part during heating of the part.

26. The method of claim 25 further comprising:
altering a flow of the air relative to the set of locations on the part during heating of the part using the heatsink that is attached to the surface through the meltable layer.

27. The method of claim 25, wherein changing the thermal conduction between the heatsink and the part comprises:
changing the thermal conduction between the heatsink and the part in response to the meltable layer melting at the selected melting temperature during heating of the part.

28. The method of claim 27, wherein changing the thermal conduction between the heatsink and the part in response to the meltable layer melting comprises:
detaching the heatsink from the part during heating of the part when the meltable layer melts to thereby reduce the thermal conduction between the heatsink and the set of locations on the part.

29. The method of claim 28, wherein changing the thermal conduction between the heatsink and the part in response to the meltable layer melting further comprises:
reducing a transfer of heat from the air to the set of locations on the part in response to the heatsink being separated from the part.

30. The method of claim 27, wherein changing the thermal conduction between the heatsink and the part in response to the meltable layer melting comprises:
increasing the thermal conduction between the heatsink and the part when the meltable layer melts.

31. The method of claim 30, wherein increasing the thermal conduction between the heatsink and the part comprises:
reducing a separation distance between the heatsink and the part when the meltable layer melts to thereby increase the thermal conduction between the heatsink and the part.

32. The method of claim 31, wherein increasing the thermal conduction between the heatsink and the part further comprises:
increasing a transfer of heat from the part to the air in response to the separation distance between the heatsink and the part being reduced.

33. The method of claim 25, wherein changing the thermal conduction between the heatsink and the part comprises:
melting the meltable layer when the meltable layer reaches the selected melting temperature during heating of the part;
detaching the heatsink from the part during heating of the part when the meltable layer melts to thereby reduce the thermal conduction between the heatsink and the set of locations on the part; and
reducing a transfer of heat from the air to the set of locations on the part in response to the heatsink being separated from the part.

34. The method of claim 25, wherein changing the thermal conduction between the heatsink and the part comprises:
melting the meltable layer when the meltable layer reaches the selected melting temperature during heating of the part;
increasing a surface area of contact between the meltable layer and the surface and between the meltable layer and the heatsink when the meltable layer melts;
increasing the thermal conduction between the heatsink and the part when the meltable layer melts in response to the surface area of contact between the meltable layer and the surface and between the meltable layer and the heatsink being increased; and
increasing a transfer of heat from the part to the air in response to the thermal conduction between the heatsink and the part being increased.

35. A method for heating a part, the method comprising:
positioning the part relative to a surface of a tooling system that is located around at least a portion of the part;
positioning a heatsink relative to the part to control a transfer of heat between air and the part relative to a set of locations on the part during heating of the part, wherein a meltable layer attaches the heatsink to the surface in which the meltable layer is configured to melt at a selected melting temperature during heating of the part;
heating the part within a heating system at a plurality of heat transfer rates relative to the plurality of locations on the part based on a positioning of the heatsink relative to the part; and
changing at least one of the plurality of heat transfer rates during heating of the part when the meltable layer reaches the selected melting temperature.

* * * * *

UNITED STATES PATENT AND TRADEMARK OFFICE
CERTIFICATE OF CORRECTION

PATENT NO. : 10,022,896 B2
APPLICATION NO. : 14/949332
DATED : July 17, 2018
INVENTOR(S) : Humfeld et al.

It is certified that error appears in the above-identified patent and that said Letters Patent is hereby corrected as shown below:

In the Claims

Column 15, Line 32, Claim 25 "system" should be deleted.

Signed and Sealed this
Fifth Day of March, 2019

Andrei Iancu
*Director of the United States Patent and Trademark Office*